Dec. 16, 1947.  G. W. JOHNSON  2,432,523
FOWL PLUCKING MACHINE
Filed Sept. 16, 1943   3 Sheets-Sheet 1

INVENTOR,
Gordon W. Johnson.
BY
Roy E. Hamilton,
Attorney.

Dec. 16, 1947.    G. W. JOHNSON    2,432,523
FOWL PLUCKING MACHINE
Filed Sept. 16, 1943    3 Sheets-Sheet 2
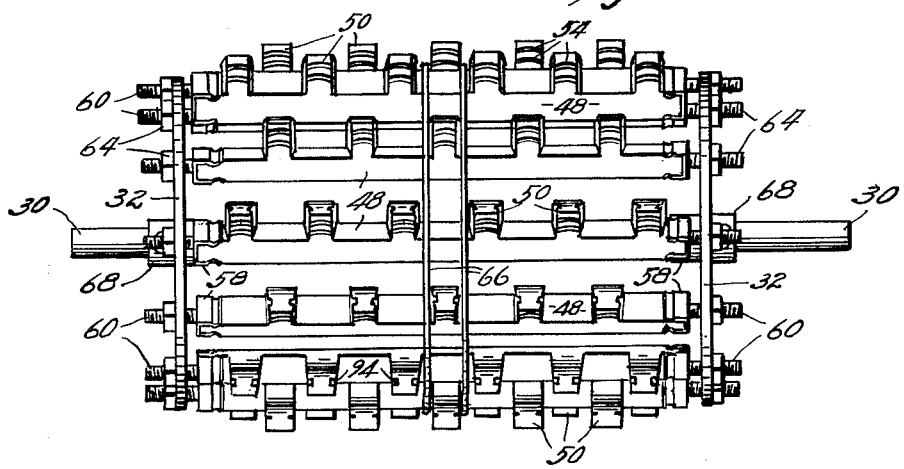
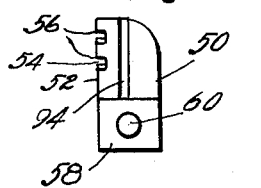
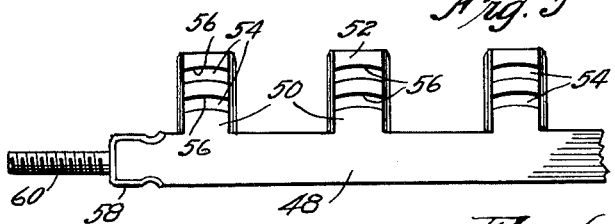
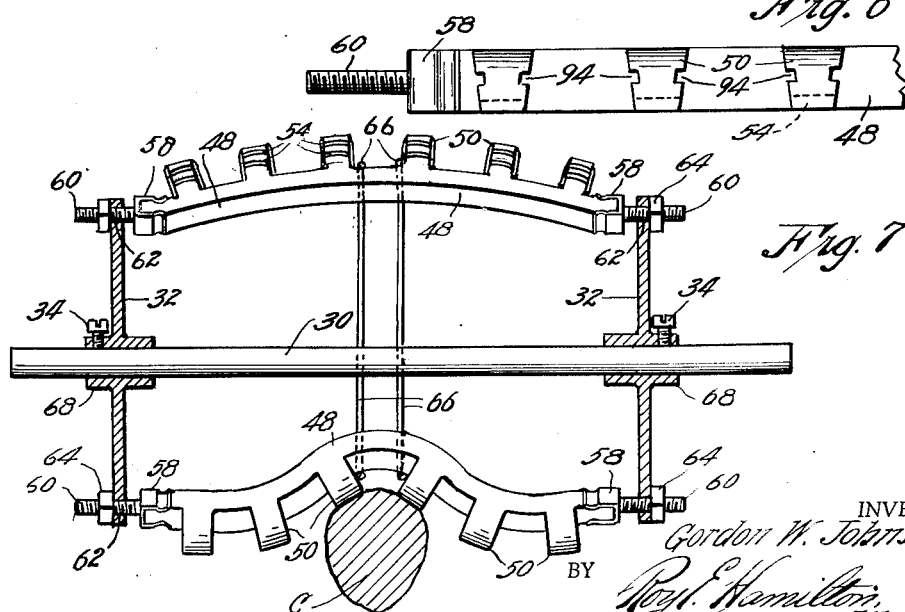
INVENTOR,
Gordon W. Johnson.
BY
Roy E. Hamilton,
Attorney.

Dec. 16, 1947.    G. W. JOHNSON    2,432,523
FOWL PLUCKING MACHINE
Filed Sept. 16, 1943    3 Sheets-Sheet 3
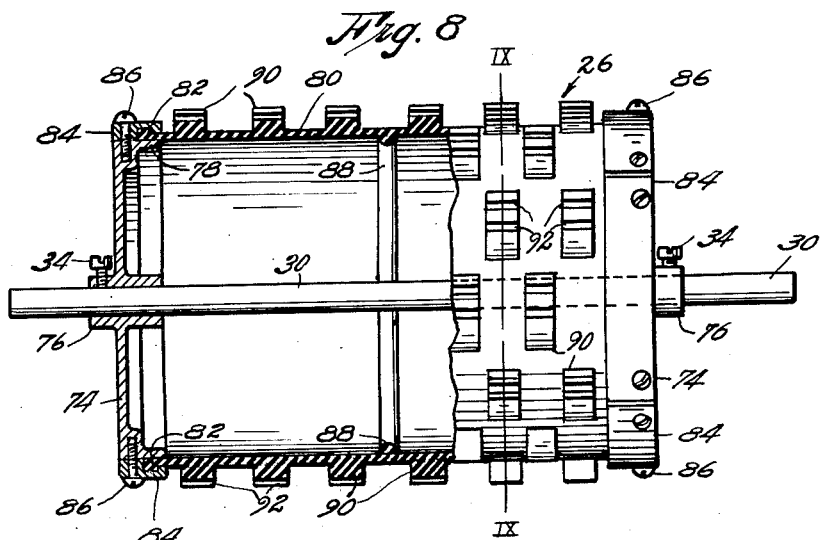
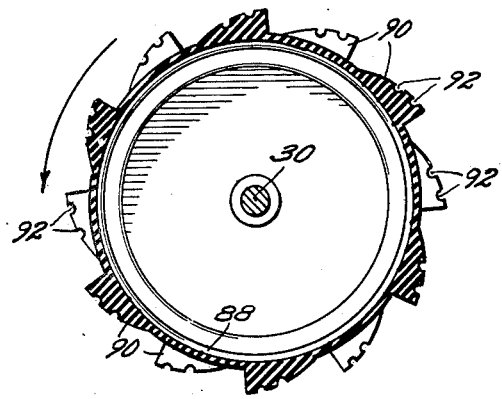
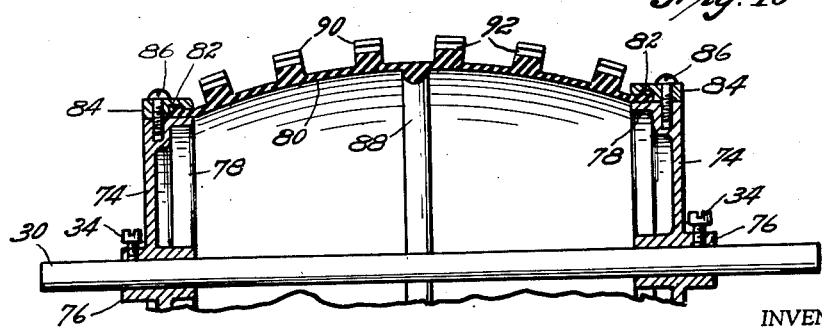
INVENTOR,
Gordon W. Johnson.
BY Roy E. Hamilton,
Attorney.

Patented Dec. 16, 1947

2,432,523

UNITED STATES PATENT OFFICE 2,432,523

FOWL PLUCKING MACHINE

Gordon W. Johnson, Overland Park, Kans., assignor to Gordon Johnson Company, Kansas City, Mo., a corporation of Missouri Application September 16, 1943, Serial No. 502,692

13 Claims. (Cl. 17—11.1)

This invention relates to improvements in fowl plucking machines and has particular reference to the rotary rubbing type.

The principal object of the present invention is the provision of a fowl plucking machine having a series of elastic members provided with feather engaging lugs carried by a rotatable member and adapted to be extended by centrifugal force as they are rotated.

Another object of this invention is the provision of a fowl plucking machine having a rotatable member including a pair of axially aligned, spaced apart discs carrying a series of elastic members secured between said discs and having outwardly extending feather engaging lugs which serve to engage and pluck the feathers from a fowl carcass held thereagainst as the machine is operated.

A further object is the provision of a poultry plucking machine provided with a series of elastic members mounted for rotation with a rotatable member and each elastic member having a series of outwardly projecting lugs the angle of which is adapted to be adjusted relative to the radius of rotation.

Other objects are simplicity and economy of construction, ease and efficiency of operation and adaptability for use in plucking the various kinds of fowls without bruising or otherwise injuring the carcass of the fowl.

Reference will now be had to the drawings wherein:

Fig. 3 is an elevational view of the rotary member shown detached from the machine.

Fig. 4 is an enlarged end elevational view of the elastic member.

Fig. 5 is a fragmentary front elevational view of the elastic member.

Fig. 6 is a plan view of the elastic member shown in Fig. 5.

Fig. 7 is a view of a portion of the rotatable member showing one of the elastic members extended by centrifugal action and the other simultaneously depressed by the action of a carcass pressed thereagainst.

Fig. 8 is an elevational view partly in section of a modified form of the rotatable member.

Fig. 9 is a cross sectional view taken on line IX—IX of Fig. 8.

Fig. 10 is a fragmentary sectional view of the modified form showing the elastic member extended by centrifugal action.

Figure 1:
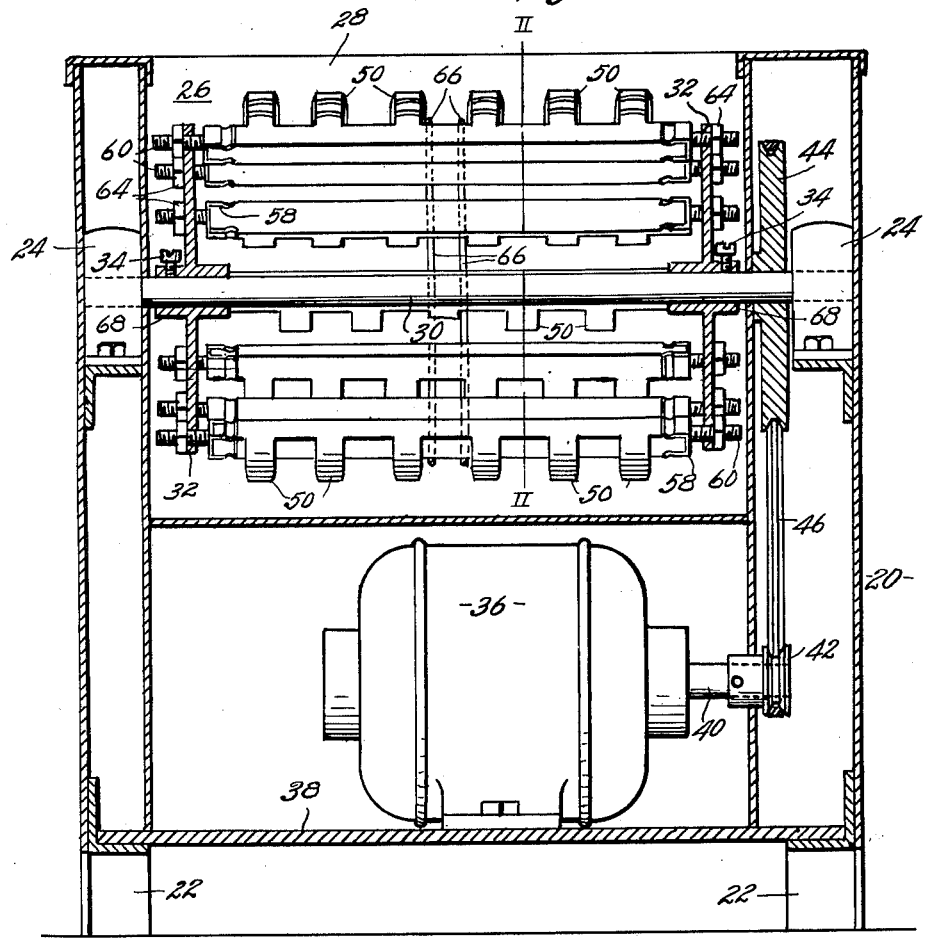
Figure 1 is a front elevation partly in section of a fowl plucking machine embodying this invention.

Throughout the several views like reference characters refer to similar parts and the numeral 20 designates a frame housing mounted on legs 22 and adapted to properly support the bearings 24 to operatively carry the rotatable member 26. The housing is open at its top side at 28 to admit the insertion of the fowl carcass to engage the rotary member 26 as hereinafter set forth.

Rotatable member 26 is provided with a shaft 30 which is rotatably mounted in bearings 24 disposed at opposite ends of the housing, and carries a pair of coaxially disposed and spaced apart discs 32 which are secured against rotation on the shaft by means of set screws 34.

A motor 36 mounted in the bottom portion of housing 20 on bench 38 has a shaft 40 to which is operatively secured a pulley 42. A relatively large pulley 44 is disposed on shaft 30 in proper relation to pulley 42 and is connected therewith by drive belt 46. To vary the speed of the rotary member the relative sizes of pulleys might be varied, or a variable speed motor might be used.

The principal feature of this machine is the rotatable member and its component parts. The elastic or resilient member 48 comprises an elongated elastic member preferably made of rubber or some similar material that may be extended under centrifugal force as the member is rotated and will retain a normal straight position when the machine is at rest. The member 48 is provided with spaced apart outwardly projecting lugs 50 which are preferably integral with the member but might be of a different material molded or otherwise attached thereto. These lugs are provided with a substantially planar forward working face 52 which is positioned to normally contact the fowl carcass during the picking operation. The working face 52 is provided with transverse undulations or slots 54 which serve to present feather engaging edges 56. These edges serve to engage and wipe the feathers from the feathered carcass as the member 26 is rotated and the carcass is held thereagainst.

A clip 58 is provided to securely engage and grip the end portion of member 48, and has an axially projecting, threaded stud 60 adapted to be threaded into disc 32 at 62 and be secured therein by means of a lock nut 64. The other end of the elastic member 48 is also provided with a clip 58 having a stud that is threaded in the opposite direction from the stud at the opposite end. This particular threading of the studs makes it possible to tension or loosen the elastic member without twisting it, and furthermore, the angle of the lugs 50 to the direction of rotation may be varied and secured by setting the lock nuts.

Referring to Fig. 3, it will be noted that the lugs 50 on adjacent members 48 are offset transversely so that their rotary paths of travel will be offset. The paths of travel of the lugs on adjacent members 48 are also spaced apart a sufficient distance to receive the smaller portions, such as legs and neck of the fowl, therebetween during the picking operation, thus facilitating a clean picking of the feathers from their parts.

The peripheral speed of member 26 is rather high so that the centrifugal force tending to stretch and move the members 48 away from their axis of rotation is greater adjacent the center of members 48 since they are attached at their opposite ends to discs 32 while the central diameter is increased and it has been found convenient to place an elastic band or bands 66 about the members 48 to limit this centrifugal pull.

The position taken by the rotary parts during operation is best shown in Fig. 7 wherein the upper member 48 is shown extended by the centrifugal force and the lower member 48 is shown depressed by the carcass forced thereagainst by the operator. It is quite apparent that not only the elastic pull of member 48 but also the centrifugal force causes this member to hug the carcass, and furthermore, the elastic tension of the members 48 may be varied by adjusting the threaded studs 60. Thus by properly adjusting the speed of rotation, and by virtue of the elastic tension of members 48 and the pressure of the carcass against the rotating members, substantially any desired feather picking condition may be obtained.

The discs 32 are provided with hubs 68 in which the set screws 34 are mounted, thus making it possible to independently adjust the discs to accommodate elastic members 48 of different lengths and also to vary the tension of the elastic members. While the elastic members 48 are shown substantially parallel with the axis of rotation, however, they may be disposed at an angle thereto by simply adjusting one of the discs 32 circumferentially on shaft 30.

Another feature contemplated by this invention includes a slight twisting of the members 48 intermediate their end supports due to the back drag of the lugs 50 thus presenting different angles of the various lugs from the radial lines.

Figure 2:
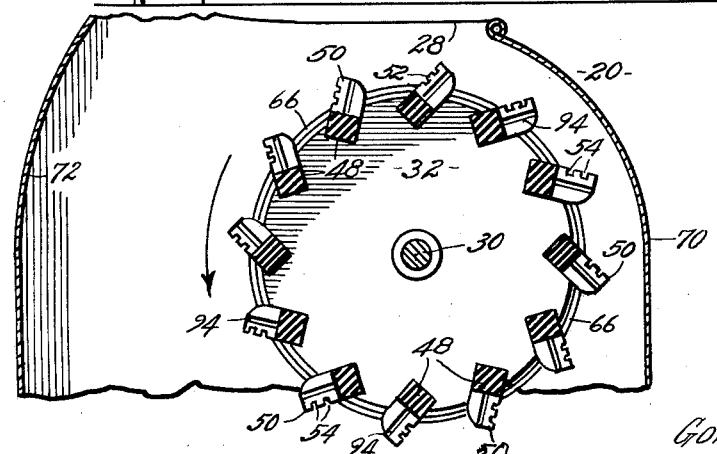
Fig. 2 is a fragmentary sectional view taken on line II—II of Fig. 1.

The operator stands adjacent the front housing wall 70 and inserts the fowl carcass through opening 28 between wall 72 and the rotary member 26 so that the carcass will contact the lugs 50 as the rotatable member is moved in the direction indicated by the arrow in Fig. 2. The operator retains his grip on the carcass until it is properly plucked and then removes it from the machine through opening 28. While but one form of the elastic or resilient member 48 has been shown, it is quite evident that many variations in form might be used since the material requirement of these members is to present feather contacting edges which serve to engage and rub the feathers from the carcass.

Referring now to the modification shown in Figs. 8, 9 and 10, it will be noted that the rotor shaft 30 is provided with two spaced apart discs 74 having hubs 76 and set screws 34 whereby the discs are secured in fixed position on the shaft. Each disc has an annular flange 78 over which is fitted the annular edges of an elastic tubular member 80. This tubular member has an annular out-turned flange 82 at each end over which the grooved clamping members 84 are positioned and secured by means of screws 86. These clamping members 84 are sectional to permit a clamping movement thereof relative to the disc flange. The inner central wall of tubular member 80 is reinforced by an annular rib 88 which precludes excessive expanding of the central portion of the member 80 due to centrifugal force when the machine is in operation. This elastic member 80 is provided with suitable lugs 90 spaced apart transversely and circumferentially in a manner similar to the lugs 50 on the preferred form. These lugs 90 are provided with transverse slots 92 thus serving to present feather engaging edges to the feathered carcass as the rotatable member is moved in the direction indicated by the arrow in Fig. 9.

As shown by Fig. 10 this rotary member 80 when rotated at a high rate of speed will be bulging out as shown due to the centrifugal force acting against the elastic material. The amount of bulging can be regulated by adjusting the discs 74 on shaft 30 and securing them at predetermined fixed apart relation by screws 34.

Referring to Fig. 7, it will be noted that when the carcass C is being pressed against the rotatable member, the elastic members 48 which are shown distended at the top of the figure, will be forced inwardly as shown at the bottom of the figure. This action of the carcass against the lugs 50 causes the lugs to hug the carcass and contact the feathers on the curved portions of the fowl as shown. Furthermore, it will be noted that the outer ends of the lugs will be moved closer together so that when the legs or neck of the fowl engage therebetween, they will be contacted at opposite sides, thus facilitating rapid and efficient plucking of the feathers from these slender parts.

When this plucking operation is being performed as just described, the centrifugal force, due to the high rotation of the rotatable member, forces the lugs against the fowl and at the same time the elastic tension set up within the individual elastic members will also force the lugs against the fowl when the elastic member is moved out of its normal straight position. There is also a back drag of the elastic members due to the frictional action of these members against the carcass and when the friction lessens there is a resultant action of the elastic members as they tend to return to their normal positions.

Referring to Figures 4 and 6 it will be noted that lugs 50 are provided with side slots 94 which serve to present feather engaging edges to contact opposite sides of the carcass members disposed therebetween during the plucking operation.

This combined elastic and centrifugal force action of the plucking parts makes it possible to quickly and efficiently pluck the feathers from the youngest fowls without objectionable scuffing or bruising of the carcass.

What I claim as new and desire to be secured by Letters Patent is:

1. In a poultry plucking machine, a pair of axially spaced apart rotatably mounted discs; and elastic strip members, having outwardly projecting feather engaging edges, suspended between said discs for rotation therewith.

2. In a fowl plucking machine, a pair of axially spaced apart and rotatably mounted discs; elongated elastic members secured in extended position between said discs; and feather-engaging lugs extending outwardly from said elastic members.

3. In a fowl plucking machine, a rotatably mounted member having axially spaced apart discs; a series of elastic members secured under tension between said discs; and a series of spaced apart lugs extending outwardly from each of said elastic members.

4. In a fowl plucking machine, a rotatably mounted member having a pair of relatively adjustable discs mounted for rotation therewith; elongated elastic members secured between said discs and adapted to be forced outwardly by centrifugal force as said rotatable member is rotated; and feather engaging edges carried by said elastic members.

5. In a fowl plucking machine, a rotatably mounted member having a pair of relatively adjustable discs, disposed in spaced apart relation and in axial alignment; a series of elongated elastic members positioned in spaced apart relation between said discs adjacent their periphery, and adapted to be forced outwardly by centrifugal force as said rotatable member is rotated, and an elastic band positioned about the central portion of said series of elastic members to limit their outward movement due to centrifugal force.

6. In a fowl plucking machine, a rotatable member having a pair of spaced apart, axially disposed discs, and elongated elastic feather engaging members, having outwardly projecting lugs, secured under tension between said discs.

7. In a fowl plucking machine, a rotatable member having a pair of spaced apart, axially disposed discs; and elongated elastic members having feather-engaging lugs secured under tension between said discs and adapted to be moved outwardly from the axis of rotation by centrifugal force as said discs are rotated.

8. In a fowl plucking machine, a rotatable member having a pair of spaced apart, axially disposed discs; elongated elastic members secured under tension between said discs and adapted to be moved outwardly from the axis of rotation by centrifugal force as said discs are rotated; and a relatively narrow elastic band positioned about the central portion of said elastic members to limit their outward movement.

9. In a fowl plucking machine, a rotatable member having a pair of spaced apart, axially disposed members; a series of elastic members disposed in spaced apart relation under tension between said axially disposed members, said elastic members having feather engaging edges adapted to contact and pluck feathers from a fowl carcass as the said machine is operated.

10. A fowl plucking machine comprising a rotatably mounted axle; a pair of independently adjustable discs axially disposed on said axle in spaced apart relation and rotatable therewith; and a series of elongated elastic members, each having a series of outwardly projecting lugs and carried in substantially parallel relation to said axle between said discs and adapted to rotate therewith to successively contact the carcass of a fowl held thereagainst.

11. A fowl plucking machine comprising a rotatably mounted axle, a pair of discs axially disposed on said axle in spaced apart relation and rotatable therewith; a series of elongated elastic members, each carried in substantially parallel relation to said axle between said discs and adapted to rotate therewith to successively contact the carcass of a fowl held thereagainst; and spaced apart, outwardly projecting lugs carried by each of said elastic members.

12. A fowl plucking machine comprising a rotatably mounted axle, a pair of discs axially disposed on said axle in spaced apart relation and rotatable therewith; and a series of elongated elastic members, each having a series of outwardly projecting lugs and each being carried in substantially parallel relation to said axle between said discs and adapted to be adjusted axially to a predetermined degree of inclination relative to its path of travel.

13. A fowl plucking machine provided with a rotatable member having a series of spaced apart elongated elastic members each having a series of feather-engaging lugs and being secured under tension at the periphery of said rotatable member and in parallel relation to the axis of said rotatable member and at the periphery thereof to successively contact and engage the feathers of a fowl held thereagainst as the machine is rotated.

GORDON W. JOHNSON.

REFERENCES CITED

The following references are of record in the file of this patent:

UNITED STATES PATENTS

| Number | Name | Date |
| --- | --- | --- |
| 2,314,700 | Hanshaw | Mar. 23, 1943 |
| 573,734 | Webster | Dec. 22, 1896 |
| 1,889,228 | Swanson | Nov. 29, 1932 |
| 2,311,365 | Campbell | Feb. 26, 1943 |
| 1,045,201 | Shoop | Nov. 26, 1912 |
| 2,276,469 | Cumings | Mar. 17, 1942 |